Dec. 15, 1931.   D. W. SCHENCK   1,836,819
DIRECTION INDICATOR
Filed Oct. 15, 1928   2 Sheets-Sheet 1
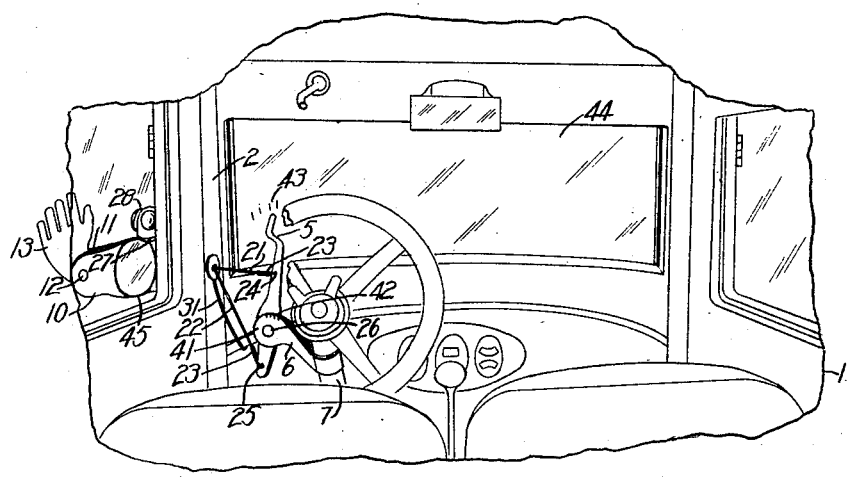
INVENTOR.
Daniel W. Schenck.
BY
ATTORNEY

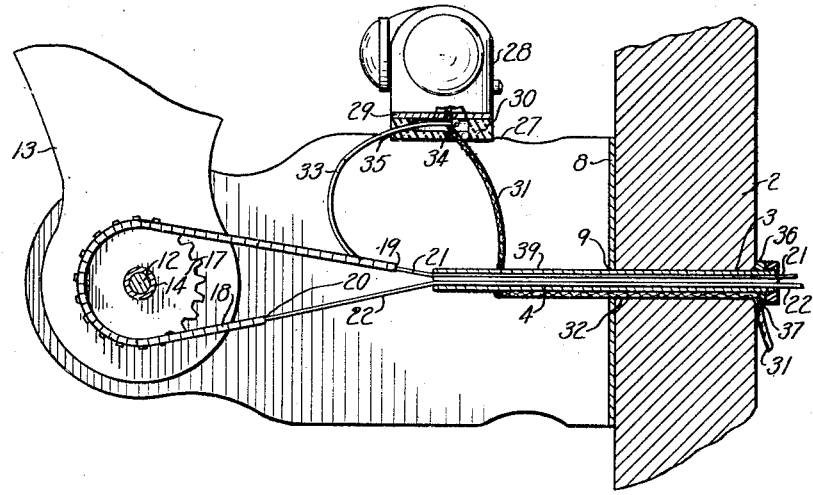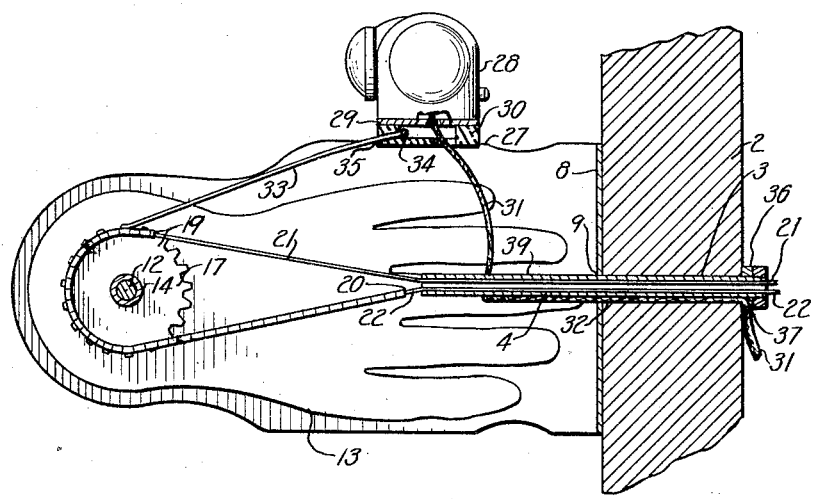

Patented Dec. 15, 1931

1,836,819

UNITED STATES PATENT OFFICE

DANIEL W. SCHENCK, OF KANSAS CITY, KANSAS, ASSIGNOR OF ONE-HALF TO ROBERT BAKER, OF KANSAS CITY, KANSAS

DIRECTION INDICATOR

Application filed October 15, 1928. Serial No. 312,471.

My invention relates to signal devices and more particularly to signals operable by the driver of a vehicle to indicate his intentions as to control of the vehicle, the principal objects of the invention being to provide easily operable means for operating a signal, to stabilize the signal housing and signal operating means, to minimize the mutilation of a vehicle for installing a signal, and to reduce hazard of damage of installation of wires leading to a light signal associated with a movable signal.

In accomplishing these and other objects of the invention, I have provided improved details of structure, the preferred forms of which are illustrated in the accompanying drawings, wherein:

Fig. 1 is a perspective view of the front portion of an automobile illustrating signals and operating means embodying my invention, installed in the automobile.

Fig. 2 is an enlarged detail transverse vertical sectional view of the signal elements and portions of the supporting frame and wire for conducting current to the light signal.

Fig. 3 is a cross sectional view of the operating mechanism for the signal showing the supporting frame fragmentarily.

Fig. 4 is a view similar to that of Fig. 2 showing the position of the parts in extreme signaling position.

Fig. 5 is a similar view showing the position of the parts in non-signaling position.

Referring in detail to the drawings:

1 designates generally an automobile including a side frame member 2 in which a relatively small horizontal opening 3 is provided for mounting a tube 4 through which the operating wires for my signals may extend, whereby signals mounted exteriorly of an automobile may be operated by a lever or handle 5 pivotally mounted on a bracket 6 supported from the steering wheel column 7, as presently described.

My signal housing and support comprises preferably a sheet of metal bent transversely along parallel lines adjacent its center to form a relatively narrow web 8 having a tube-receiving opening 9 and adapted to be mounted on the frame member 2 and outwardly extending wings or arms 10 and 11 supporting a pin 12 adjacent their outer ends on which a movable signal such as a hand 13 is mounted, the hand being adapted to swing between the wings into retracted position and outwardy into a plurality of positions for indicating the direction in which the vehicle is to be turned and for similar purposes as indicated in Fig. 2.

An exteriorly threaded bolt 14 is rotatably mounted on the pin 12 and spacing washers such as 15 and 16 threaded on the bolt retain and space a sprocket 17 and the hand 13 which are mounted on the bolt, the bolt and the assembly of washers, sprocket and hand being freely rotatable over the pin between the wings of the housing.

I mount a chain 18 on the sprocket within the housing, having free ends 19 and 20 connected respectively to wires 21 and 22 passing through the tube 4 and toward the lever handle 5 at angles depending on the pivotal position of the lever handle, the lever ends of the wires being connected by coil springs 23 to spaced points 24 and 25 on the lever on opposite sides of the pivot 26 by which the lever is mounted on the bracket, whereby when the lever is rotated, the wires will be moved in opposite directions to cause the chain to operate the sprocket and hand for indicating intentions of the driver.

Ears 27 are provided on the upper edge of the plate and they are outbent to provide shelves or brackets on the housing wings to support a lamp casing 28 including a contact disk 29 insulated from the housing by a base 30 and adapted to be grounded for completing a circuit through the lamp. A circuit wire or conductor 31 from a source of current not shown, for example a battery, grounded in the automobile, is constantly conductively connected with the lamp, and extends from the lamp downwardly between the wings of the housing and in a groove 32 formed in the bottom of the opening 3 toward the battery, whereby the wire may be safely conducted from the housing through the frame member 2 without passing it through the tube or requiring additional perforations in the frame.

A relatively stiff resilient conductive wire 33 is attached to a link of the chain and its upper end having an enlarged tip 34 is mounted in an opening 35 in the insulating base 30 of the casing, to bear upwardly against the bottom of the disk and constitute a brush contact, being moved forwardly and backwardly into and out of engagement with the disk by the alternate movements of the chain actuated by the lever. The wire is substantially straight when the hand is in fully retracted non-signaling position as shown in Fig. 5, the enlarged tip being withdrawn from the disk 29 but the end of the wire remaining in the base opening 35. When the chain moves in a direction to extend the hand, the tip 34 of the wire will move into circuit making position in contact with the disk for grounding the circuit through the chain and the tip end portion of the wire will be cramped in the base 30 due to bending of the main portion of the wire as the chain-engaged end thereof passes toward the casing, the wire 33 finally assuming the position shown most clearly in Fig. 4, wherein the hand is in extreme signaling position. When the hand is moved toward retracted position, the chain will move the ground wire end portion 34 away from the contact disk into the inner end of the opening of the insulating base.

The tube 4 is preferably elongated for my special purpose, so that it may extend exteriorly to the frame member 2 on the inside sufficiently to accommodate an insulating washer 36 having a notch 37 to receive the bent portion of the conductor 31 as it passes inwardly from the frame member 2, and a nut 38; and may extend a substantial distance outwardly for attachment to the inner face of the housing. The outer end 39 of the tube is preferably welded to the adjacent wing of the housing, for example 10, to provide for supporting the housing from the tube.

A depression or groove 40 is formed in the wing adjacent the extremity of the tube 4 to provide a channel for the passage of the conductor 31 from the light between the tube and the housing wing 10 toward the frame, and thus avoid passing the wire over the tube in the area in which the hand swings. The depression is preferably formed by offsetting the outer end of the wing 10, as clearly shown in Fig. 3.

The handle bracket 6 includes a friction disk member 41, and indicating marks 42 and 43 are provided on the disk and on the wind shield 44 for guiding the operator in positioning the lever for different signaling positions of the hand.

The web 8 is adapted to be bolted to the frame member 2; and in my structure the tube is adapted to serve the purpose of a bolt, the outer elongated end of the tube being welded to the wing of the housing before the second wing 11 is bent; the conducting wire is laid in the groove of the frame opening, and the housing is then mounted on the frame by projecting the inner end of the tube through the opening. The washer is then installed, the notched portion thereof receiving the conductor and protecting the same. The nut is installed on the threaded inner end of the tube to latch the tube and housing to the frame, the nut being rotated as far as desired to enforce engagement of the housing with the frame since the notched washer prevents damage to the conductor.

The housing provides a convenient support for accessory items, and I mount a mirror 45 on the wing 10 where it will reflect objects at the rear of the vehicle to the driver.

The edge of the frame member is ordinarily beveled; and the provision of the bolt-like tube for fastening the housing to the frame is particularly useful, since the tube is preferably welded to the housing wing opposite to the high margin of the frame edge, whereby the tube will cooperate with the portion of the housing web that engages said high margin to clamp the housing to the frame.

The spacers on the rotatable threaded bolt position the parts for movement of the hand into the housing adjacent the opposite side thereof from the tube, and the swedged depression in the housing arm permits the disposition of the conductor along the side of the housing opposite the space in which the hand moves, so that hazard of engagement of the hand with the conductor is reduced to a minimum.

In operating the device, the lever handle is moved appropriately to operate the wires for rotating the sprocket to move the hand outwardly into a desired indicating position, and as the upper run of the chain moves inwardly, the grounding wire moves into contact with the disk to close the lamp circuit, so that the lamp is energized when the hand is in an exposed and indicating position.

The handle can be operated with relatively small exertion on the part of the operator, and may be easily controlled. The spreading of the operating wires at both ends of the conducting tube provides frictional engagement therewith for braking and stabilizing the operation of the lever so that the hand may be easily stopped at any position, varying angular relation of the wires with the inner end of the tube causing variance in resistance to lever movement and providing a tactual guide for positioning the signal hand.

The lever may be moved oppositely to return the hand to the housing, and withdraw the grounding wire from the disk of the lamp casing.

What I claim and desire to secure by Letters Patent is:

1. In combination with a frame member of a motor car, a hand housing comprising a central web engaging the frame and parallel wings, a tube fixed to one wing of the housing and extending through the web and frame, a signal hand pivotally mounted on the housing, means including the tube for securing the housing to the frame, and means for rotating the hand including a wire extending in the tube and a lever on the opposite side of the frame from the housing for operating the wire.

2. In combination with a frame member of a motor car, a hand housing, a tube fixed to the housing and extending through the frame member, a signal hand movably mounted on the housing, means for securing the housing to the frame, and means for moving the hand including a pair of wires extending through the tube and diverging to engage the end of the tube for frictionally retarding the movement of the wires, and a lever for operating the wires adapted to vary the angular relation of the wires to the end of the tube.

3. In apparatus of the character described including a frame member having an opening, a housing comprising a web and parallel wings, a tube fixed to one wing of the housing, and extending through the web and through the opening in the frame member, means on the inner end of the tube for clamping the web to the frame member, a signal mounted on the housing, and means for operating the signal including a wire extending through the opening of the frame member and through the web and between the wings to the signal.

4. An automobile direction signal device comprising a support, a signal mounted on the support, and means for operating the signal including a lever handle pivotally mounted on the automobile and a flexible member operatively connected to the signal and engaging one edge of the support, said member having ends connected to the lever handle at points on opposite sides of the pivotal mounting thereof for varying the frictional engagement of the member with said edge of the support.

5. In apparatus of the character described, a frame member provided with an opening, a web engaging the frame member in face to face relation therewith and having an opening registering with the opening in the frame member, parallel spaced wings extending outwardly from the web to form a housing, a tube mounted in the opening of the frame member and having an inner end projecting inwardly from said member and an outer end portion extending through the web aperture into the space between the wings, means securing the tube to one of said wings, means on said inner end of the tube for clamping the housing to the frame, a signal mounted on the housing, and a wire extending through the tube for controlling the signal.

In testimony whereof I affix my signature.

DANIEL W. SCHENCK.